United States Patent [19]
Hartke et al.

[11] Patent Number: 6,012,434
[45] Date of Patent: Jan. 11, 2000

[54] FUEL SYSTEM VAPOR SEPARATOR FOR AN INTERNAL COMBUSTION ENGINE

[75] Inventors: David Hartke, Gurnee; Richard P. Kolb, Prairie View, both of Ill.

[73] Assignee: Outboard Marine Corporation, Waukegan, Ill.

[21] Appl. No.: 09/119,362

[22] Filed: Jul. 20, 1998

[51] Int. Cl.[7] .................................................. F02M 37/04
[52] U.S. Cl. ......................................... 123/516; 123/541
[58] Field of Search .................................. 123/516, 541, 123/41.31

[56] References Cited

U.S. PATENT DOCUMENTS

| | | | |
|---|---|---|---|
| 4,887,578 | 12/1989 | Woodcock et al. | 123/519 |
| 4,981,584 | 1/1991 | Nunes | 210/86 |
| 5,103,793 | 4/1992 | Riese et al. | 123/516 |
| 5,119,790 | 6/1992 | Olson | 123/516 |
| 5,146,901 | 9/1992 | Jones | 123/516 |
| 5,156,134 | 10/1992 | Tochizawa | 123/541 |
| 5,309,885 | 5/1994 | Rawlings et al. | 123/509 |
| 5,368,001 | 11/1994 | Roche | 123/516 |
| 5,579,740 | 12/1996 | Cotton et al. | 123/516 |
| 5,647,331 | 7/1997 | Swanson | 123/516 |
| 5,855,197 | 1/1999 | Kato | 123/516 |

*Primary Examiner*—Thomas N. Moulis
*Attorney, Agent, or Firm*—Fletcher, Yoder & Van Someren

[57] ABSTRACT

A fuel system vapor separator has an outer housing member with a generally cylindrical internal wall and has two open opposed ends. A generally cylindrical inner housing member is fitted within the outer housing member and defines a sealed space between the two housing members. The housing members are sealingly closed at both ends. An inlet introduces fuel into the central region of the inner housing member while another inlet introduces a coolant fluid into the space defined between the outer and inner housing members for cooling the fuel. A float operated valve vents out fuel vapor accumulating within the inner housing member. The housing members are formed by an extrusion process such that they can be cut to various lengths depending upon the desired size of the assembled vapor separator.

14 Claims, 4 Drawing Sheets

FUEL SYSTEM VAPOR SEPARATOR FOR AN INTERNAL COMBUSTION ENGINE

BACKGROUND OF THE INVENTION

1. Field of the Invention

The present invention relates generally to a vapor separator for the fuel system of an internal combustion engine and, more particularly, to a fuel system vapor separator which has an enhanced water cooling feature and simplicity of manufacture due to the construction of its various parts.

2. Description of the Related Art

It has long been known in the internal combustion engine art that heat build up of an engine can adversely affect the fuel supply system by causing the fuel to become vaporized before it is introduced to the engine's combustion chambers. Such a condition is sometimes referred to as vapor lock. Not only does this condition interfere with proper engine combustion and consequent engine power performance, it can have a damaging effect on engine components by causing the engine to run too lean and overheat. It is particularly disadvantageous in fuel injected engines.

Devices are known for reducing or eliminating vaporized fuel in the fuel delivery system of internal combustion engines. Typically, such prior art devices include a housing through which fuel is passed and in which vapor is allowed to separate from the liquid fuel. The vapor is then vented to the atmosphere through a valve arrangement which may be operated by a float assembly. While such devices perform acceptably in many applications, they can be expensive to manufacture because of the intricacy of their component parts and their consequent requirement of relatively long assembly time. A further disadvantage of known vapor separators is that they must be sized for use with a specific engine and thus tooling costs can be expensive in order to manufacture a variety of sizes of vapor separators for use on differing size engines.

Accordingly, it is desirable to provide a fuel system vapor separator which is by its design relatively simple to manufacture and assemble in a variety of sizes. It is further desirable to provide such a vapor separator which operates more efficiently than prior art devices by virtue of also having a fuel cooling feature.

SUMMARY OF THE INVENTION

The present invention improves over the prior art by providing a fuel system vapor separator having an outer housing member with a generally cylindrical internal wall and having two open opposed ends. A generally cylindrical inner housing member is fitted within the outer housing member and defines a sealed space between the two housing members. The housing members are sealingly closed at both ends. An inlet introduces fuel into the central region of the inner housing member while another inlet introduces a coolant fluid into the space defined between the outer and inner housing members for cooling the fuel. A float operated valve vents out fuel vapor accumulating within the inner housing member. The housing members are formed by an extrusion process such that they can be cut to various lengths depending upon the desired size of the assembled vapor separator.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENTS

Figure 1:
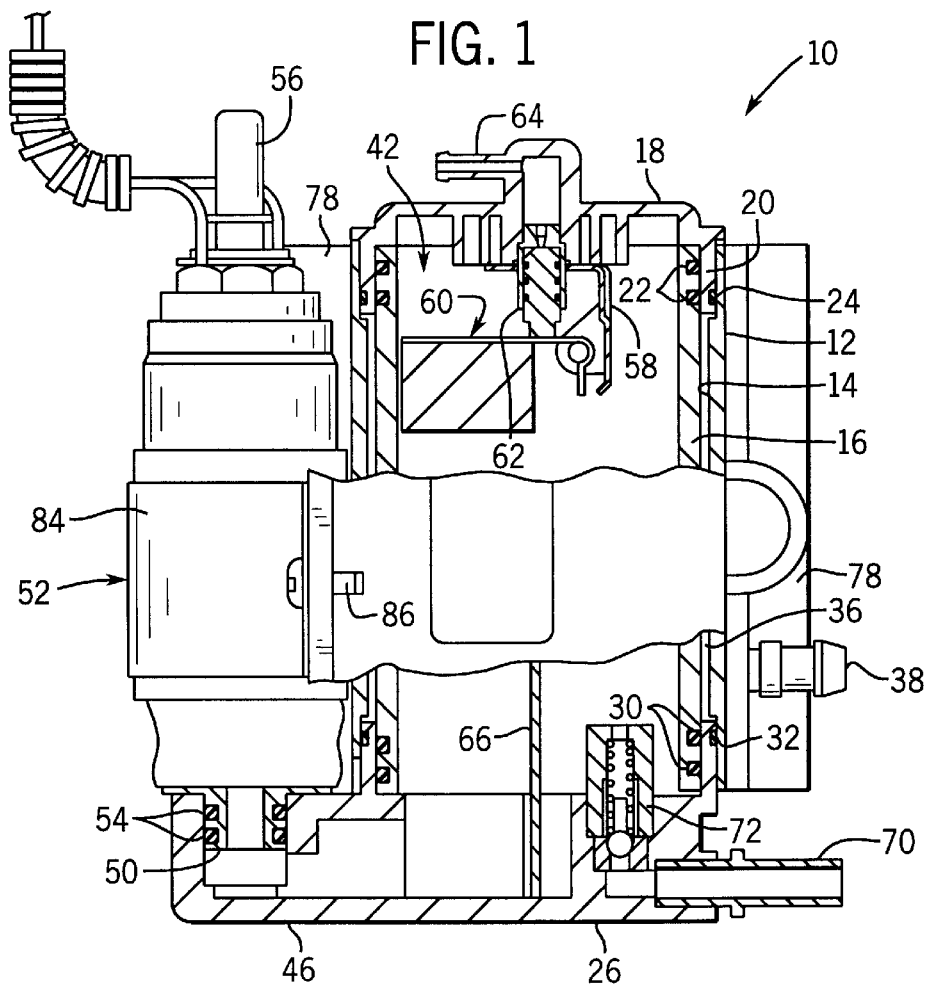
FIG. 1 is a side elevational view, partially in section, of a fuel system vapor separator constructed in accordance with the principles of the invention.

Referring now to the drawings, and initially to FIGS. 1–4, a form of fuel system vapor separator constructed in accordance with the invention is designated generally by the reference numeral 10 and includes as a principal component an outer housing 12 forming an outer reservoir as will be described hereinafter. The housing 12 is formed by typical extrusion techniques and preferably is made of a suitable aluminum composition. Housing 12 is formed to define a generally cylindrical internal wall 14. Within the housing 12 is a sleeve-like inner housing 16 forming an inner reservoir which may likewise be of an aluminum composition. An upper cover 18 has an annular wall 20 which is sealed to the inner housing 16 by a pair of radial seals 22 or O-rings. The wall 20 is also sealed to the outer housing 12 by a radial seal 24. The assembly 10 also includes a lower cover 26 having an annular wall 28 which is sealed to the bottom of the inner housing 16 by a pair of radial seals 30 and to the bottom of the outer housing by a radial seal 32.

The assembly of the two housings 12 and 16 is such that the inner housing 16 is spaced from the outer housing 12 sufficiently to form an outer annular reservoir 36 through which water is circulated under pressure from the engine's water cooling pump. Typical water pressure is on the order of 40 psi. The water enters the reservoir 36 through a lower nipple 38 and exits through an upper nipple 40. The inner housing 16 defines a cylindrical reservoir 42 into which fuel is introduced through a main inlet nipple 44. The fuel within the reservoir 42 is, therefore, cooled by the circulating water.

Figure 2:
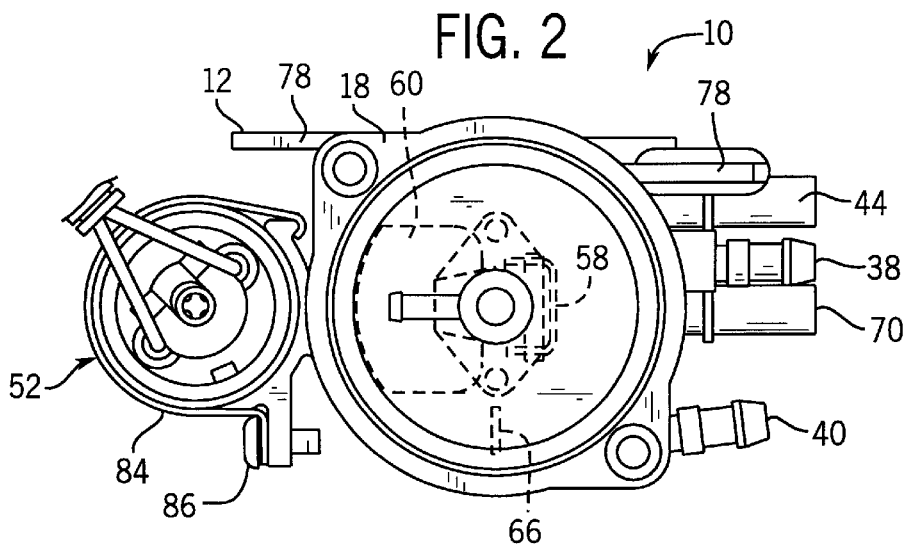
FIG. 2 is a top plan view thereof.
Figure 3:
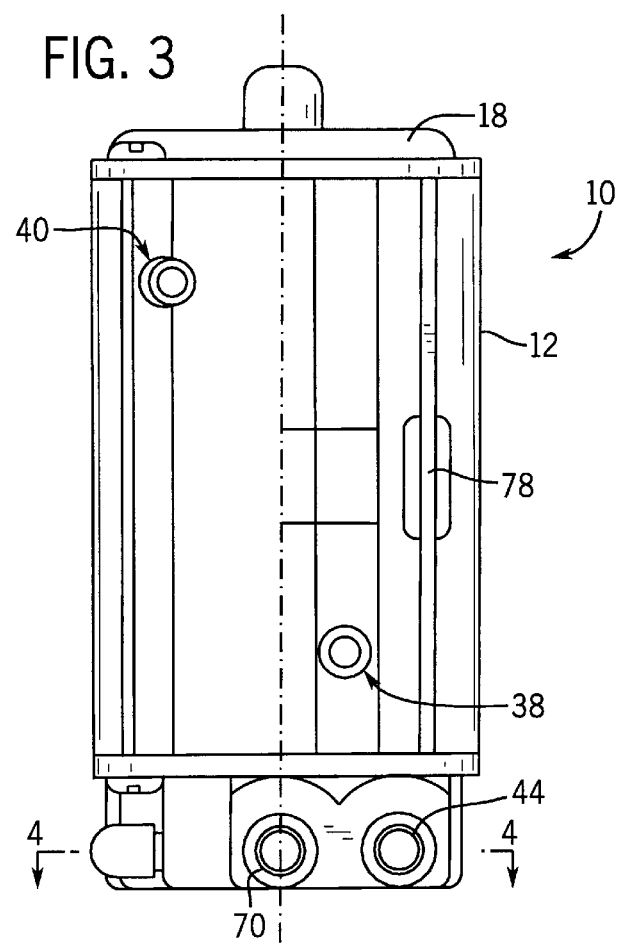
FIG. 3 is an end view thereof.
Figure 4:
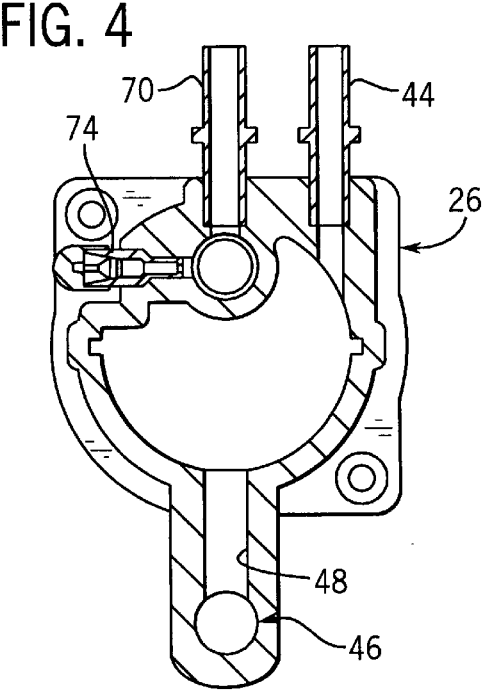
FIG. 4 is a cross-sectional view taken substantially along the line 4—4 of FIG. 3.

In preferred form, the lower cover 26 includes a laterally extending housing portion 46 having an internal passage 48 which is configured to receive a nipple 50 on the bottom end of an electric fuel pump 52. The nipple 50 is sealed within the passage 48 by a pair of radial seals 54. The fuel pump 52 has an upper nipple 56. Thus, fuel is pumped through the reservoir 42 from the inlet nipple 44 to the outlet nipple 56. As best seen in FIGS. 1 and 2, the upper cover 18 is fitted with a bracket 58 which pivotably supports a float 60. The float 60 operates a needle valve 62. When fuel vapor accumulates within the reservoir 42 to the point that the float 60 drops and opens the needle valve 62 vapor will thereby be vented out of the cover 18 through a nipple 64. A baffle 66 is preferably provided within the middle of the reservoir 42 to help circulate the fuel and thus enhance the cooling effect of the water passing through the reservoir 36. Preferably, the assembly includes a return inlet nipple 70 and check valve assembly 72 to return fuel from the fuel distribution system of the engine. Also, as best seen in FIG. 4, a valve assembly 74 may be provided for testing the fuel pressure of the system or for purging the inlet fuel line to the assembly 10 with the pressurized air.

Figure 5:
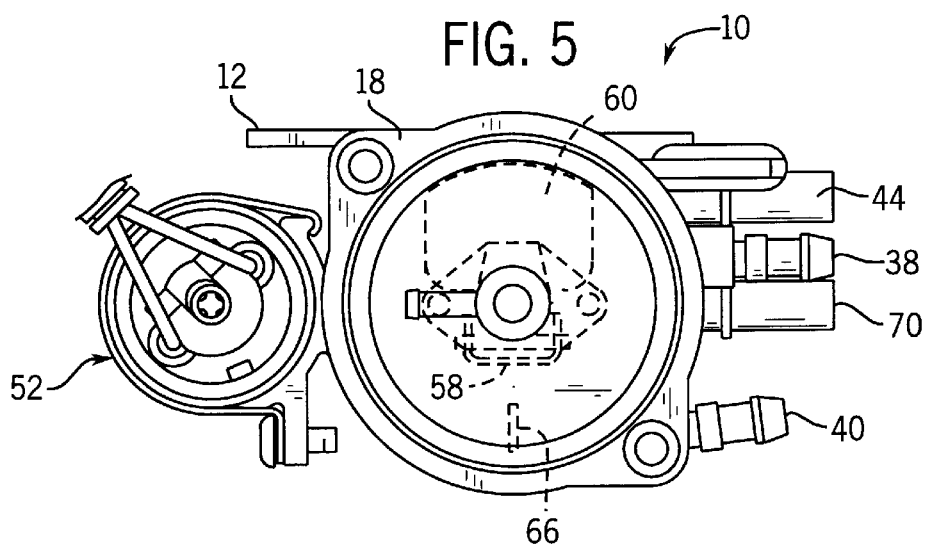
FIG. 5 is a top plan view thereof illustrating one position of the vent float.
Figure 6:
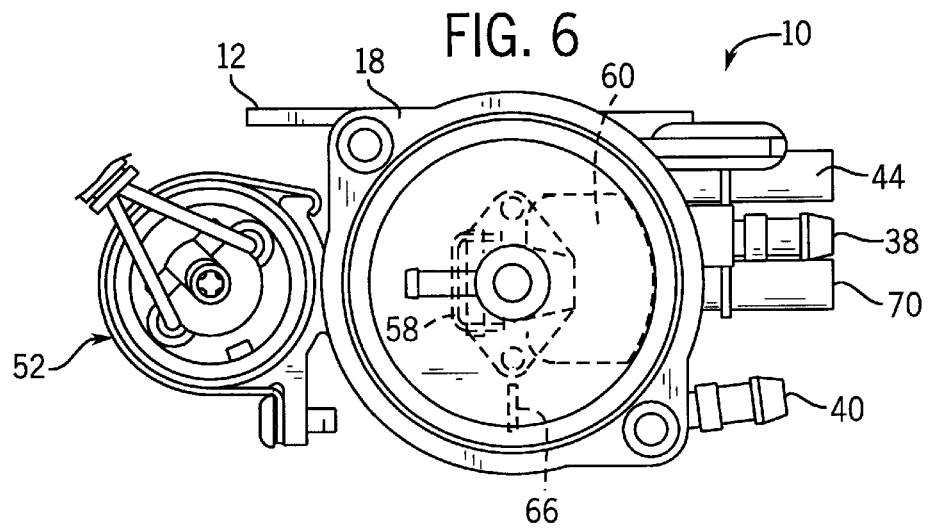
FIG. 6 is a top plan view thereof illustrating an alternative position of the vent float.

Referring to FIGS. 1, 5 and 6, it can be seen that the novel construction of the vapor separator 10 allows for a variety of mounting orientations of the float 60 depending upon the specific engine design with which the separator 10 is to be used. This is accomplish by attaching the float bracket 58 to the cover 18 in one of any desired rotational positions.

Figure 7:
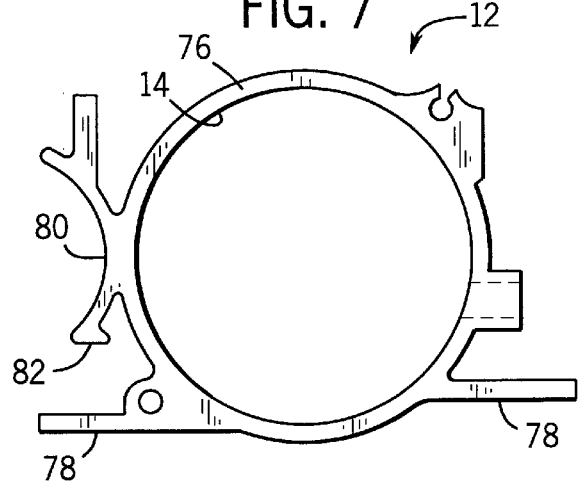
FIG. 7 is a bottom plan view of an outer housing member for the vapor separator constructed in accordance with the principles of the invention.

Turning now to FIG. 7 wherein a bottom view of the outer housing 12 is shown. The housing 12 can be seen to be integrally formed with a generally cylindrical body portion 76 having a pair of opposed mounting flanges 78 for mounting the assembly 10 to an engine block, for example. Also, extending to one side is a flange or saddle 80 which is configured to receive and mount the fuel pump 52 to the housing 12. To this end the flange 80 is provided with a hookshaped edge portion 82 which is engaged by a suitable strap 84 (see FIG. 1) such that the fuel pump can be pressed into the lower cover 26 and secured by a single machine screw 86.

Figure 8:
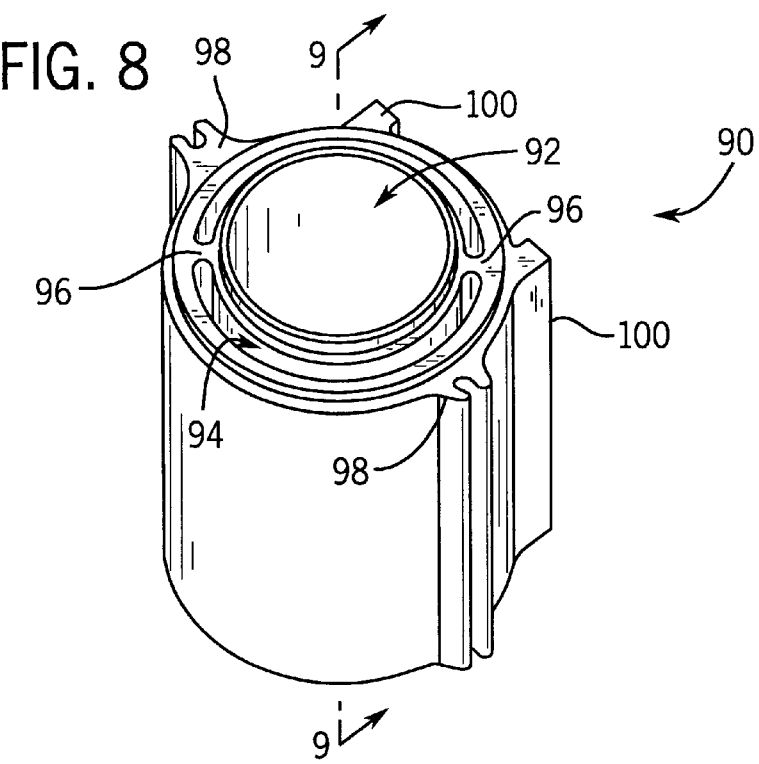
FIG. 8 is a perspective view of a second form of housing for the vapor separator wherein the inner and outer reservoirs are formed as a one-piece extrusion.
Figure 9:
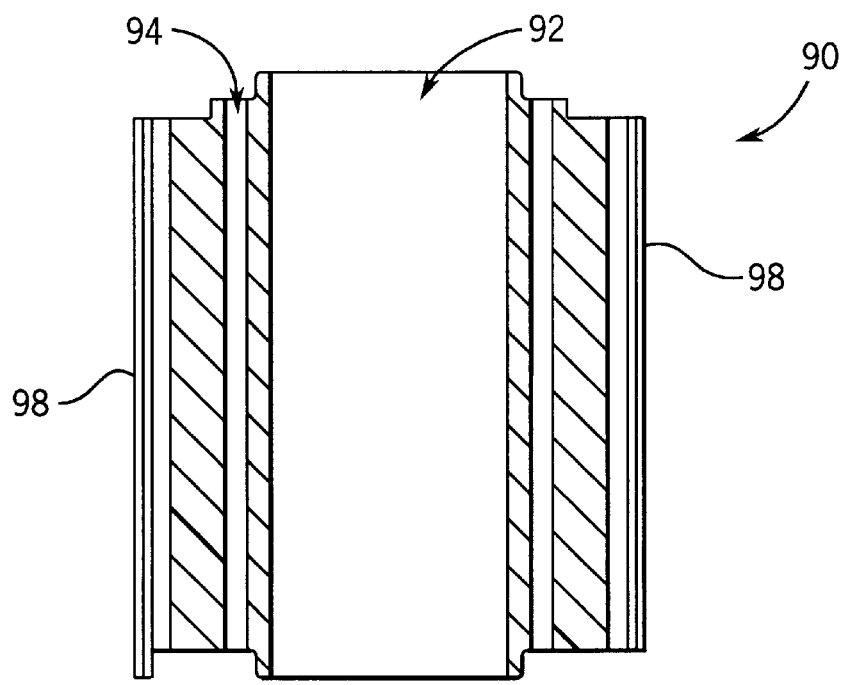
FIG. 9 is a cross-sectional view taken substantially along the line 9—9 of FIG. 8.

A second form of housing is illustrated in FIGS. 8 and 9 and designated generally by the reference numeral 90. This form of housing is particularly advantageous in that it is formed by an extrusion process to define an integral inner reservoir 92 and an outer reservoir 94 connected by a pair of webs 96. Suitable mounting projections 98 may be provided to mount top and bottom covers (not shown). Also, projections 100 may be provided to which a fuel pump may be attached. O-ring seals may be used to seal the top and bottom covers to the housing 90.

It can now be appreciated that a fuel system vapor separator constructed according to the invention offers considerable advantages of being effective in use and also being highly cost-effective to manufacture. The vapor separator 10 is particularly suitable for use in connection with outboard engines for marine applications. Because the housings 12 and 16 and 90 can be readily formed by extrusion techniques, they may simply be cut to any desired length to fabricate a vapor separator of a size suitable for a specific engine. Also, as heretofore noted, the float 60 may be easily oriented to function in a variety of mounting arrangements on a particular engine. An important aspect of the invention resides in the use of all radial or O-ring seals to seal the various components together. This feature makes the separator 10 relatively easy to assemble and highly reliable in use. Although the housings 12 and 16 and 90 preferably define generally cylindrical interior reservoirs for purposes of allowing the float 60 to be rotated in assembly of the separator 10, essentially any shape of the reservoirs may be advantageously used because of simplicity of forming the housings 12 and 16 and 90 by extrusion.

While the present invention has been described in connection with preferred embodiments thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. A fuel system vapor separator for an internal combustion engine comprising:
    a first housing member having an internal wall, and having two open opposed ends;
    a second housing member fitted within said first housing member and defining a sealed space between said second housing member and said first housing member internal wall;
    means for sealingly closing the two ends of the two housing members;
    means for introducing liquid fuel into a central region of said second housing member;
    means for introducing a coolant fluid into the space defined between the housing members for cooling said fuel; and
    means for venting out fuel vapor accumulating within said second housing member;
    wherein said first housing member is formed by an extrusion process and can be cut to various lengths depending upon the desired size of the assembled vapor separator.

2. The vapor separator of claim 1 wherein said internal wall of said first housing member is generally cylindrical.

3. The vapor separator of claim 1 wherein said second housing member has a generally cylindrical external wall.

4. The vapor separator of claim 1 wherein said means for sealingly closing the ends of the two housing members includes a pair of covers each having an annular wall which fits between the two housing members.

5. The vapor separator of claim 4 including radial seals for sealing the two housing members to the annular walls of the covers.

6. The vapor separator of claim 4 wherein one of said covers is an upper cover which supports a float and valve assembly for venting fuel vapor from within said second housing member.

7. The vapor separator of claim 6 wherein said float assembly is selectively rotatable on said cover to allow for varying mounting orientations of said vapor separator on an engine.

8. The vapor separator of claim 1 including a baffle positioned within said second housing member to circulate fuel introduced within said second housing member.

9. The vapor separator of claim 1 wherein said first housing member includes an integrally formed outwardly projecting flange portion for mounting a fuel pump to said first housing member.

10. The vapor separator of claim 9 wherein said flange portion is provided with a hook-shaped edge portion for receiving a mounting strap for said fuel pump.

11. The vapor separator of claim 4 wherein one of said covers is a lower cover provided with a laterally extending housing portion having a fuel passage therein for fluid communication with a fuel pump.

12. The vapor separator of claim 11 wherein said passage is configured to receive a nipple on an end of said fuel pump.

13. The vapor separator of claim 12 wherein said nipple is sealed to said housing portion by at least one radial seal.

14. The vapor separator of claim 1 wherein said first and second housing members are formed as an integral structure by an extrusion process.

* * * * *